United States Patent [19]

Kröhling

[11] Patent Number: 4,593,779
[45] Date of Patent: Jun. 10, 1986

[54] COMBINATION INTERNAL COMBUSTION AND ELECTRICAL DRIVE VEHICLES

[75] Inventor: Erich Kröhling, Reinbek, Fed. Rep. of Germany

[73] Assignee: Still GmbH, Hamburg, Fed. Rep. of Germany

[21] Appl. No.: 745,060

[22] Filed: Jun. 14, 1985

Related U.S. Application Data

[63] Continuation of Ser. No. 451,973, Dec. 21, 1982, abandoned.

[51] Int. Cl.⁴ .............................................. B60L 11/12
[52] U.S. Cl. .................................... 180/65.4; 307/84; 320/62
[58] Field of Search .................... 180/65.2, 65.3, 65.4, 180/65.5; 290/9, 11, 45, 50; 320/61, 62; 307/66, 67, 84

[56] References Cited

U.S. PATENT DOCUMENTS

| 3,477,537 | 11/1969 | Plishner | 180/65.4 |
| 3,497,027 | 2/1970 | Wild | 180/65.4 |
| 3,894,605 | 7/1975 | Salvadorini | 180/65.4 |
| 4,199,037 | 4/1980 | White | 180/65.4 X |
| 4,339,015 | 7/1982 | Fowkes et al. | 180/68.5 X |

FOREIGN PATENT DOCUMENTS 53670   8/1920   Sweden ................................. 290/9

*Primary Examiner*—John J. Love
*Assistant Examiner*—Michael Mar
*Attorney, Agent, or Firm*—Buell, Ziesenheim, Beck & Alstadt

[57] ABSTRACT

A combination internal combustion and electric drive vehicle is provided having a frame, a battery suspended from the frame between two parallel spaced axles carrying supporting wheels, at least one elective drive motor driving at least one wheel, an internal combustion engine on the frame drivingly connected to a generator and connections between the generator and each of the electric motors and the battery whereby the battery may be recharged and electric motor may be driven by the generator and the electric motor may be driven by the battery independently of the generator.

6 Claims, 2 Drawing Figures

COMBINATION INTERNAL COMBUSTION AND ELECTRICAL DRIVE VEHICLES

This application is a continuation of my application Ser. No. 451,973, filed Dec. 21, 1982 now abandoned.

This invention relates to combination internal combustion and electrical drive vehicles and particularly to a vehicle capable of carrying a payload, such as a platform truck or industrial tractor or a lift truck with battery-electric drive, in which the battery is located between the axles.

At the present time it is frequently necessary to travel with such payload vehicles in enclosed spaces or areas in which no exhaust gases are permissible during certain operating phases, and to travel such great distances at such a high speed or such a great traction load in the open air or in areas in which exhaust gases are permissible, that covering such distances by battery power would be uneconomical due to the charge capacity of the battery and its limited rechargeability. The use of vehicles that are equipped with a diesel generator unit in addition to the battery and which is placed in operation for travel in the open air and feeds the electric traction motors through the generator, for this purpose is known. In the vehicles of this type known to date, the vehicular construction is based on the design of a vehicle with purely battery-electric drive, in which the battery is located in a space that is open at the top and can be removed and installed from the top and a smaller battery than in the normal state is inserted into this space and the diesel generator unit is inserted into the unoccupied battery space. This arrangement has the disadvantage that the diesel generator unit is not readily accessible for maintenance purposes.

The invention proposes a vehicle in which both battery replacement and the maintenance of the unit consisting of internal-combustion engine and generator are readily possible.

In order to solve this problem, the unit consisting of internal-combustion engine and electric generator is located above the battery. This unit is thus readily accessible, while the relatively heavy battery is positioned comparatively low, thus providing a low center of gravity for the overall vehicle.

It is particularly advantageous if the vehicle is equipped with a platform and the battery is located underneath the platform level to be removal from the side, and the unit consisting of the internal-combustion engine and generator is located above the platform level, in which case a portion of the platform is left free behind this unit consisting of internal-combustion engine and generator and serves as a residual loading surface for a payload or for ballast weight for loading the drive axles for pulling large traction loads. It is thus quite possible to replace the batteries, which are removed and inserted from the side, and the accessibility of the internal-combustion engine is also good and a ventilation of the space in which the internal-combustion engine and generator are located in also readily possible without the danger of the heat being unnecessarily transfered to the battery.

A particularly advantageous arrangement results if the internal-combustion engine is positioned crosswise to the longitudinal axis of the vehicle and the generator is coupled directly to the crankshaft or flywheel of the internal-combustion engine, provided the width of the vehicle and the length of the internal-combustion engine and generator so permit, or if the generator is located alongside the internal-combustion engine such that the crankshaft of the engine and the shaft of the generator lie parallel to each other. If two generators are present, one can be coupled with the internal-combustion engine and the other can be located alongside it.

The invention thus concerns a vehicle with one or more electric motor or motors acted upon by a direct current for the traction drive, possibly electric motors for additional drives and with a battery and with a unit consisting of an internal-combustion engine, preferably a diesel engine, and a generator, in which case the battery is selectively connected through controls to the traction motor or motors in one switching state or the generator of the unit consisting of internal-combustion engine and generator is connected in another operating state to the electric motor or motors, whereby this vehicle is characterized in that the unit consisting of internal-combustion engine and generator is located above the battery, in which case the battery is preferably positioned between the axles underneath a platform level and is removable from the side.

In the foregoing general description of this invention, I have set out certain objects, purposes and advantages of this invention. Other objects, purposes and advantages of this invention will be apparent from a consideration of the following description and the accompanying drawings in which.

Figure 1:
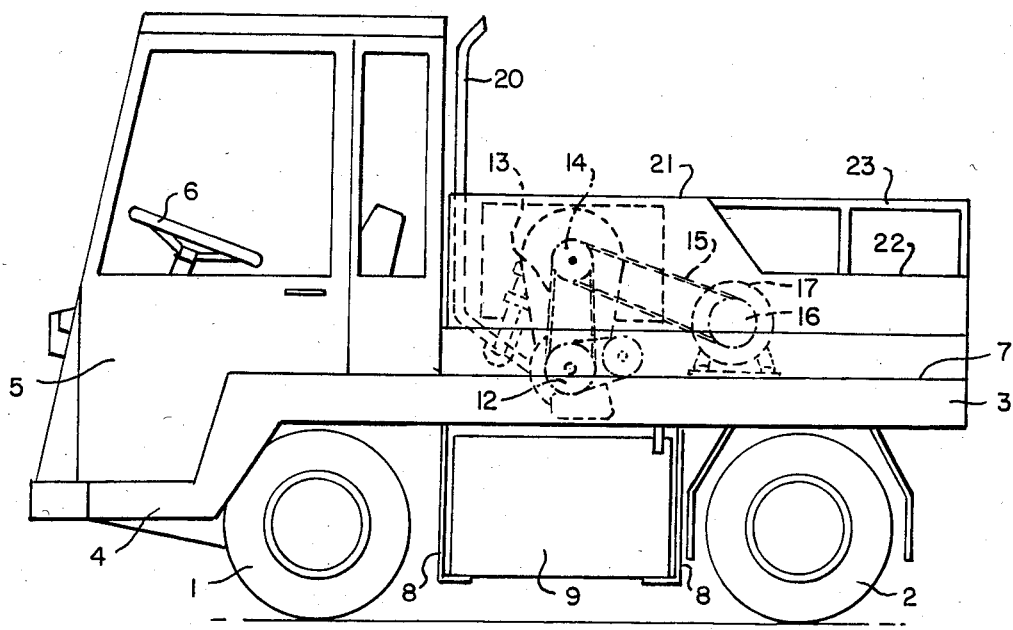
FIG. 1 is a side elevational view of a vehicle according to this invention.
Figure 2:
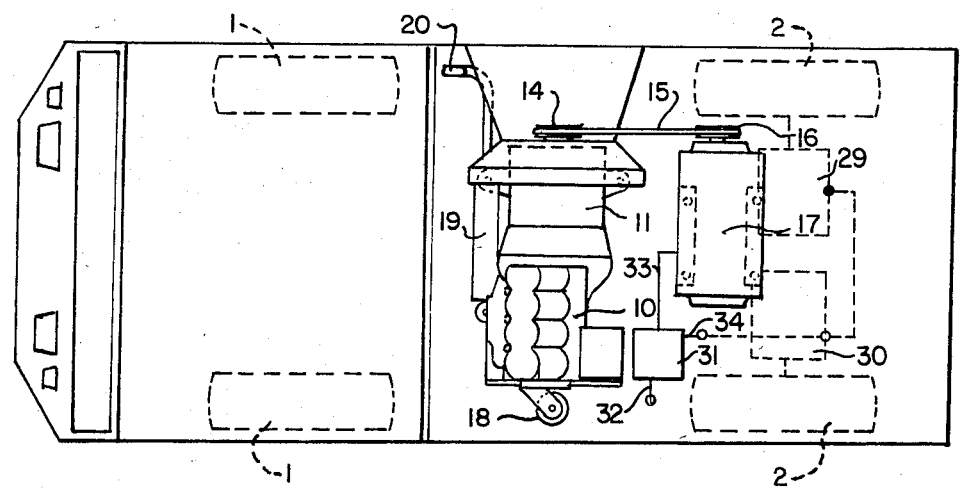
FIG. 2 shows a plan view with the motor hood removed.

Referring to the drawings, I have illustrated a vehicle which has two steerable front wheels 1 and two rear wheels 2 which are driven by a d.c. electric motor (not shown in the drawing).

The wheels 1 and 2 of the vehicle are suspended on a vehicular frame 3 in any of various conventional arrangements. The front portion 4 of the vehicular frame is offset. A driver's cab 5, in which a steering wheel 6 is provided for steering the wheels 1, is located on the front section of the vehicular frame.

A load platform, whose upper level is designated by 7, is located in the frame 3 in the region lying above the rear axles assigned to the wheels 2. Two supporting walls 8 are attached to the bottom of the frame 3 and a battery 9 is supported in them such that it can be removed from the side of the vehicle for replacement or servicing, i.e., perpendicular to the plane of the drawing in FIG. 1. An internal-combustion engine 10 is positioned above the battery 9 such that the crankshaft 10 lies parallel to the axles of wheels 2 and wheels 1 in their straight-forward attitude, i.e., perpendicular to the longitudinal median plane of the vehicle. A generator 11 is coupled directly to the crankshaft of the internal-combustion engine 10; its purpose is to drive the traction motor or motors coupled with the drive wheels 2. A belt pulley 12 is located on the shaft of the generator 11; from it a V-belt 13 runs to a twin V-belt pulley 14 on the shaft of a generator, which feeds a starter and illuminating battery (not shown in the drawing). Another V-belt 15 runs from the belt pulley 14 to the V-belt pulley 16 of a second generator 17 that is automatically regulated to a constant voltage, independently of the r.p.m. of the internal-combustion engine 10, and which charges the battery 9 when the internal-combustion engine 10 is running. The unit consisting of internal-combustion engine 10 and generator 11 is supported on elastic suspension systems 18. The exhaust gases of the engine 10 are carried off via a muffler 19 through an exhaust pipe 20. A hood 21 is placed over the unit formed of the engine 10, generator 11, and generator 17; in its rear section this hood 21 has a load surface 22 that is surrounded by a railing 23.

Each of the drive motors 29 and 30 are connected with a wheel 2 being driven. A modulator switch box 31 is located conveniently on the vehicle. This switch box is connected with battery 9 through line 32 which passes through an opening in load platform 7. Switch box 31 is also connected to generator 17 through a line 33 and to motors 29 and 30 by a line 34. All of the foregoing are wired in conventional fashion.

Switch box 31 is operable to connect selectively the generator 17 to motors 29 and 30 or to connect battery 9 to motors 28 and 30 depending on the power source desired.

In the foregoing specification I have set out certain preferred embodiments of my invention, however, it will be understood that this invention may be otherwise embodied within the scope of the following claims.

I claim:

1. A combination internal combustion and electric drive vehicle particularly for carrying a payload in and out of enclosed areas, comprising a frame, supporting wheels on a pair of spaced generally parallel axles on said frame, at least one electric drive motor drivingly connected to at least one of said supporting wheels, a battery container suspended from said frame between said axles, a battery in said container, an internal combustion engine on said frame, a first electric generator connected to and driven by said internal combustion engine and first electrical connections from said first generator to said electric drive motor whereby electrical energy from said first generator may be used to drive said electric drive motor when the vehicle is outside an enclosed area and second electrical connections from said battery to the electric drive motor for driving said drive motor independently of the internal combustion engine and with the internal combustion engine stopped in enclosed areas, a second constant voltage generator driven by said internal combustion engine connected to said battery whereby said battery is being recharged at all times when the internal combustion engine is operating and a switch box for selectively connecting said battery to said second generator or said electric drive motor.

2. A vehicle according to claim 1 having a platform on said frame and characterized in that the battery is located underneath the platform and can be removed from the side of the vehicle, and the internal-combustion engine and generators are located at least essentially above the platform level over the battery.

3. A vehicle according to one of claims 1 or 2, characterized in that the internal-combustion engine is perpendicular to the longitudinal median plane of the vehicle.

4. A vehicle according to claim 3, characterized in that the first generator is coupled directly to the shaft of the internal-combustion engine.

5. A vehicle according to claim 3, characterized in that the shaft of the internal-combustion engine and the shaft of the first generator are positioned parallel to each other.

6. A vehicle according to claim 3, characterized in that the first generator is arranged coaxially to the internal-combustion engine and the second generator is located alongside the internal-combustion engine.

* * * * *

UNITED STATES PATENT AND TRADEMARK OFFICE
CERTIFICATE OF CORRECTION

PATENT NO. : 4,593,779
DATED : June 10, 1986
INVENTOR(S) : ERICH KROHLING

It is certified that error appears in the above-identified patent and that said Letters Patent is hereby corrected as shown below:

Column 1, line 5, after "my" insert --copending--.

Signed and Sealed this

Eleventh Day of November, 1986

Attest:

DONALD J. QUIGG

*Attesting Officer*     *Commissioner of Patents and Trademarks*